Sept. 5, 1933.  M. E. GARRISON  1,926,013
ELECTRICAL PROCESS
Filed April 22, 1929

INVENTOR:
MURRAY E. GARRISON,
By

ATTORNEY.

Patented Sept. 5, 1933

1,926,013

UNITED STATES PATENT OFFICE 1,926,013

ELECTRICAL PROCESS

Murray E. Garrison, Los Angeles, Calif., assignor to Petroleum Rectifying Company of California, Los Angeles, Calif., a corporation of California Application April 22, 1929. Serial No. 356,896

16 Claims. (Cl. 204—24)

My invention relates to electric treaters, and more particularly to a novel method of and apparatus for treating petroleum emulsions to separate the phases thereof.

Petroleum as it comes from the well is often associated with minute water particles to form a water-in-oil emulsion, the water being the dispersed phase and the oil being the continuous phase. This emulsion must be broken before the oil is commercially valuable, and one method at present in use for accomplishing this end is to pass the emulsion between a pair of electrodes held at a difference in potential of several thousand volts.

The treating action which takes place as the emulsion passes through such an electric field is apparently one which causes an agglomeration of the water particles into relatively large masses which will gravitate from the oil upon settling. The water particles of the emulsion have a tendency to line up during the passage of the emulsion through the field, and form paths of relatively low resistance which tend to short-circuit the electrodes, and thus remove the electric field therebetween. Further treating action in the treating space is thus impossible until the short-circuiting chains are broken.

Various methods have been devised for breaking these chains, some treaters being designed to agitate the emulsion during treatment, while others depend upon a high velocity of flow through the treating space in preventing this short-circuiting action. In the latter method very little actual separation of the water and oil takes place in the treating space.

I have found it desirable to allow the phases of the emulsion to be separated while under the influence of the electric field. I have furthermore found that in introducing a stream of emulsion into a body of treated or semi-treated fluid, there is a marked tendency for the emulsion to follow certain definite paths through the body of fluid rather than to be equally dispersed therein. One of the objects of this invention is to prevent this channeling action by introducing the emulsion tangentially.

I have furthermore found that most efficient dehydration is obtained when the potential between the electrodes is just below the point where short-circuiting chains are most readily formed. This point, of course, varies with the spacing of the electrode, the voltage impressed therebetween, and the character of the surface of the electrode. I have found it possible, however, to automatically regulate the voltage gradient across the field so that the treating action may be automatically maintained at its most efficient point, it being an object of this invention to control the gradient across an electric field as a function of the voltage across these electrodes.

In the preferred embodiment of my invention I prefer to utilize conical electrodes which provide a treating space of decreasing cross-section. Such a treating space allows the accomplishment of a number of objects of this invention. In the first place, the emulsion is introduced into the larger end of the treating space, and is progressively subjected to higher voltage gradients as the treating action continues and as the water separates from the oil. Furthermore, I have found extremely desirable results accruing from the tangential injection of the emulsion into the treating space. This is probably due not only to the fact that the water particles are thrown out by centrifugal force, but also to the fact that moving the emulsion in contact with a downward diverging surface apparently aids in separating the phases thereof. This is probably due to the fact that the water particles are subjected to a strong downward force as they contact this sloping surface, thus aiding the settling action of these water particles from the oil. This is especially true when the emulsion is in an electric field at the time it contacts the downward sloping surface.

My invention thus has for its objects certain novel processes and combinations of mechanical and electrical elements whereby the above results are obtained.

More specifically this invention has for one of its objects the introduction of an emulsion or other fluid to be treated into a treating space wherein is maintained an electric field the gradient of which increases in the direction of movement of the emulsion or other fluid.

Another object of the invention comprehends the use of concentric conical electrodes defining a treating space into which the emulsion or other fluid to be treated is introduced either tangentially or in other directions.

Still a further object of the invention is to provide a method of treating an emulsion by moving this emulsion into pressural contact with a downward sloping surface.

Another object of the invention is to provide such a downward sloping surface formed of a material preferentially wetted by one of the phases of the emulsion.

Still a further object of the invention is to provide a novel treater in which the voltage gradient across the field is automatically controlled to compensate for varying conductivities of the fluid being treated.

Still further objects and advantages of this invention will be evident to those skilled in the art from the following disclosure.

The treater of my invention is diagrammatically illustrated in the accompanying drawing, wherein—

Figure 1:
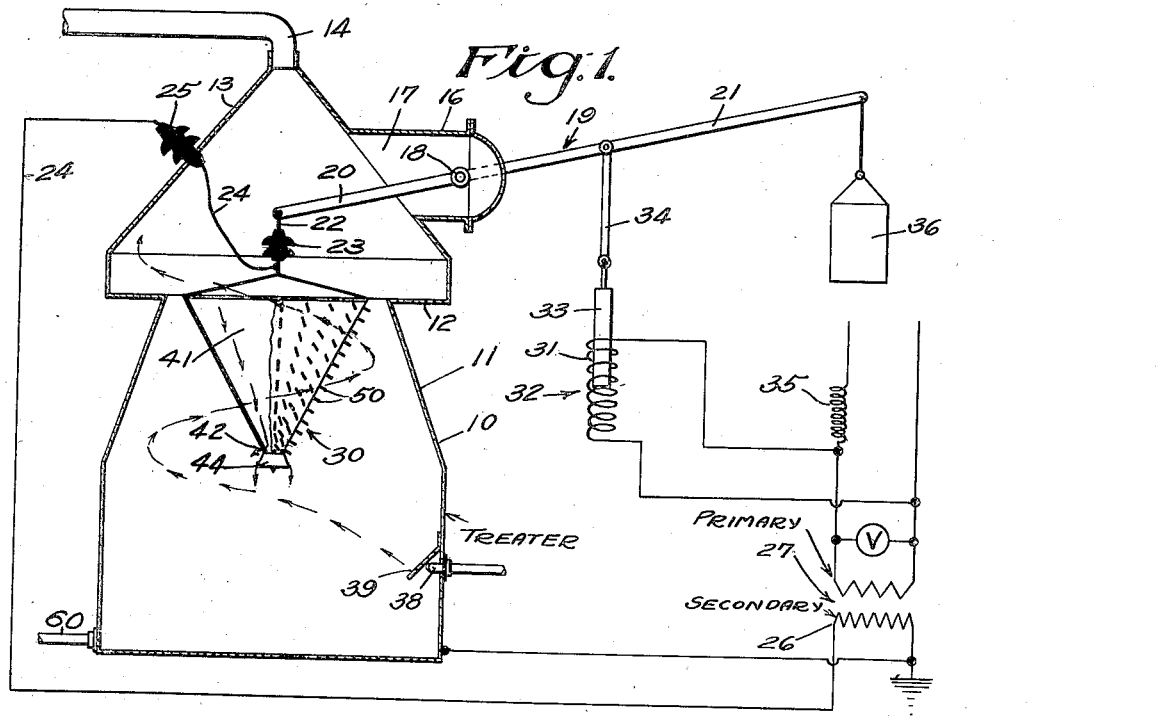
Fig. 1 is a utility view of my treater and the electrical connections therefor.
Figure 2:
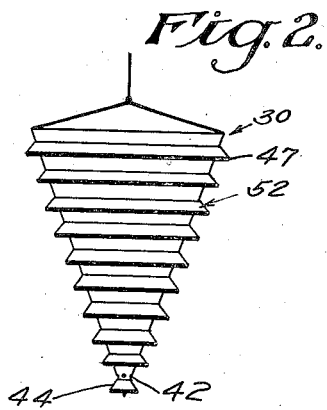
Figs. 2 and 3 are alternative forms of electrodes for use with my treater.

Referring particularly to Figs. 1 and 2, my invention comprehends the use of a treating tank 10 formed of a shape clearly illustrated in these figures. This tank comprises the grounded electrode of the invention, that portion of the tank which is utilized primarily as the grounded electrode being indicated by the numeral 11 and being hereinafter termed the grounded electrode. The walls of this grounded electrode are tapered so as to converge upwardly, and connect to a flat plate 12. The upper portion of the tank includes a dome 13, to the top of which an oil outlet pipe 14 is connected, and to the side of which a container 16 is secured, this container providing a pivoting chamber 17 in communication with the interior of the dome 13.

Pivoted in the container 16 on a rod 18 is an operating means comprising an arm structure 19 formed with an inner arm 20 positioned in the chamber 17, and an outer arm 21 positioned outside thereof. A suitable supporting member 22 is secured to the inner end of the inner arm 20, and extends substantially coaxially with the tank 10. The supporting member includes an insulator 23 so that the lower end of this member may be energized by a lead 24 passing through an insulator 25, this lead being connected to one terminal of a secondary 26 of a transformer 27. The other secondary terminal is grounded and is also connected to the tank 10.

Suspended from the supporting member 22 is an inner live electrode 30 which is conical in shape, the walls thereof diverging upward as clearly indicated in Figs. 1 and 2. The axis of this live electrode lies along the axis of the tank 10, although I have found that a slight variation in lateral position of the axis of the live electrode relative to the axis of the tank 10 is not detrimental to the treating action.

The vertical position of the live electrode 30 is dependent upon the position of the arm structure 19 which is, in turn, dependent upon the amount of current passing through a winding 31 of a solenoid 32. This solenoid has an armature 33 connected to the outer arm by a link 34, and the winding thereof is connected in parallel with the primary of the transformer 27 so that the pull on the armature is dependent upon the voltage supplied across the terminals of the primary of the transformer. Due to the placement of a choke coil 35 in one lead of the supply line feeding the transformer, this voltage varies in response to variations in current passing through the primary of the transformer.

A counterweight 36 is attached to the free end of the outer arm and acts in conjunction with the weight of the armature 33 and link 34 to exert a torque on the shaft 18 which is greater than the torque on this shaft due to the weight of the live electrode. Any current passing through the winding 31 tends to force the armature 33 upward until a dynamic balance is reached.

The live electrode 30 is hollow, and provides a chamber 41 into which any water particles which reach the interior of the dome 13 drop, due to these particles being heavier than the particles of oil. Any water particles reaching the chamber 41 are conducted toward the apex thereof, and pass from the chamber through one of a plurality of openings 42. One or more of these openings may be utilized, but it is desirable that they be small in order that none of the emulsion introduced into the lower end of the tank 10 may rise therethrough. If the openings 42 are large, it is desirable to place small check valves therein which are opened by the differential pressure exerted thereon by the water in the chamber 41 and the emulsion surrounding the live electrode.

Ordinarily the water coming from such a series of openings would pass downward in contact with the outer surface of the live electrode and would drop therefrom at the apex. A short-circuit would thus be formed between the apex of the live electrode and the water in the lower portion of the treating tank 10.

To prevent this, I provide a deflector 44 joined to the live electrode at a point just below the openings 42, this deflector being in the form of a skirt over which the water must pass before dropping from the live electrode. This skirt is circular, and the water is discharged and electrically dispersed therefrom in the form of a cylindrical sheet rather than from the apex of the live electrode. This deflector has been found to eliminate the short-circuiting tendency which would otherwise occur.

The emulsion, or other fluid to be treated, is introduced into the lower portion of the tank 10 by a tangential nozzle 38 placed under a baffle 39. This emulsion thus imparts a rotary movement to the fluid inside the tank 10, and prevents any channeling of the emulsion through the fluid in the treating space formed between the electrodes 11 and 30.

As the emulsion moves upward in the treating space it is subjected to a field of increasing gradient. The treating action tending to agglomerate the water particles present in a given mass of emulsion thus increases during the upward movement of this mass. As the water particles in this mass agglomerate they drop slowly downward against the flow of emulsion. The main body of emulsion present in the treating space is thus progressively dryer toward the top thereof where the short-circuiting tendency is the greatest. Thus no series of water particles need be subjected to a gradient more intense than that actually needed to agglomerate these particles, and short-circuiting tendencies are thus decreased.

The converging shape of the treating space is thus a very important part of this invention regardless of the spiralling motion of the body of emulsion as it moves upward through the treating space. However, even superior results are derived from this type of spiralling movement, for, besides the prevention of channeling previously mentioned, I have found that such a movement of the emulsion accomplishes a quicker settling of the water phase. This is, no doubt, due to the centrifugal force exerted on the particles adjacent the inner sloping face of the grounded electrode causing an agglomeration thereupon.

In the first place, such particles are usually water due to the greater centrifugal forces exerted on the water particles over those forces exerted on particles of oil of similar sizes. Then, too, in moving particles of oil and water of equal size into pressural contact with a downward sloping surface, the water particle will be forced downward with greater force than the oil particle, due to the difference in specific gravities of the two liquids. Thus, if the velocity of flow of the particles along the inner surface of the grounded electrode is so regulated that the downward force on the dry oil particles substantially equals, or is slightly less than, the upward force on this particle due to its being of lower specific gravity than the surrounding medium, the water particles will still be forced downward, thus tending to accelerate their separation from the dry oil. This rotating of the fluid in the treating space thus tends to set up a filtering action preventing the rise of particles of wet oil or water, but permitting a rise of dry oil particles.

Furthermore, the fact that most of the fluid immediately adjacent the inner surface of the grounded electrode is water is advantageous, inasmuch as a film of water is thus formed which will follow down the electrode surface in the event that the slope of this electrode surface is not too great. Such a stream tends to collect water particles and carry these particles downward to the main body of water in the bottom of the tank from which point it is removed through an outlet pipe 60.

In exceptional instances there will, however, be a short-circuiting of the electrodes, or at least a tendency toward this end. This causes increased current through both the primary and secondary windings of the transformer and a consequent larger voltage drop across the choke coil 35. This, in turn, decreases the potential across the solenoid winding and decreases the upward thrust on the armature 33, thus allowing the counterweight 36 to raise the electrode 30.

Considering the fluid undergoing treatment at any particular section, it should be clear that such an upward movement at this section decreases the voltage gradient and consequently the short-circuiting tendency. The position of the central electrode is thus automatically changed to meet changing conductivity of the material in the field, and to break any short-circuiting chains which may form.

If desired, the treater may be so operated that the fluid filling the narrowest portion of the treating space, that opposite the shelf 12, will be dry oil; in other words, all the water particles will have separated out prior to reaching this portion of the field. In other circumstances a small amount of water may be carried above the electrode and it is this water, if present, that will pass downward through the live electrode and discharge through the openings 42.

I have found that the treating action is very much increased by the placement on the live electrode of a large number of points 50 extending toward the grounded electrode 11. The number and length of these points are important factors, but these factors may best be determined empirically inasmuch as no fixed rule can be given which will meet all conditions. These factors vary with the shape of the electrode, the type of emulsion being treated, the spacing of the electrodes, etc.

It is often desirable to replace the points 50 by annular ledges 52 such as are shown on the electrode of Fig. 2. These ledges are preferably beveled as indicated at 47 to prevent the accumulation thereon of certain bottom settlings which form when a petroleum emulsion is subjected to an electric field and allowed to separate.

Figure 3:
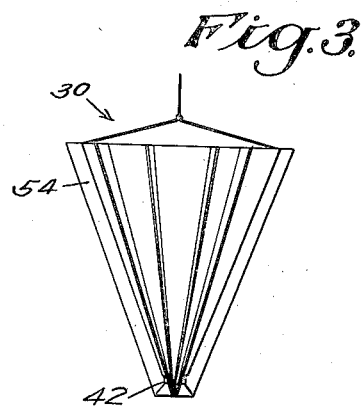

Another desirable type of electrode is illustrated in Fig. 3 wherein longitudinal fins 54 are placed along the length of the electrode 30, these fins having sharp edges and serving substantially the same purpose as the points 50 and ledges 52, this purpose being primarily for intensifying the field adjacent the central electrode.

The object of using these points or fins on this electrode is to obtain points of high field intensity from which charged particles of the oil or water agglomerated on this electrode during treatment may be electrically charged and dispersed immediately within the treating zone or field, thus causing a much faster and cleaner treatment of the emulsified oil.

Whether points or edges are used on the conical electrode depends upon the kind of oil undergoing trtatment in order to obtain the most efficient results. Points give a more intense electrical field than do the edges. I am not limited in my invention to the placement of points 50, edges 52 or fins 54 on any particular electrode for they may be placed on either the live or grounded electrode or upon both. Thus, it is sometimes desirable to place points on the grounded electrode which tend to disperse charged particles of water back into the treating space and thus further aid in the treatmenu of the emulsion by causing a more rapid agglomeration and settlement. Best results are, however, especially obtained with these points or edges arranged on the central electrode.

I claim as my invention:

1. A method of treating an emulsion, which includes the steps of: providing an electric field of increasing intensity toward the top thereof; introducing emulsion tangentially into the lower end of said field to agglomerate a phase thereof, said emulsion rotating due to its tangential introduction and rising at a velocity less than the settling velocity of said phase; removing said agglomerated phase from a point below said electric field; and removing the material forming the other phase at a point above said field.

2. A method of treating an emulsion, which comprises: providing a downwardly diverging conical surface; and bringing a rotating body of treated petroleum emulsion containing oil and water into contact with a water-wetted surface of said conical surface in a manner to separate the phases of said emulsion.

3. In a dehydrator, the combination of: a pair of conical electrodes having common axes, the walls of said electrodes diverging in opposite directions; and means for axially moving one of said electrodes relative to the other as a function of the voltage impressed across said electrodes.

4. In a dehydrator, the combination of: an outer primary electrode; a secondary electrode of cup-shape having ports in the lower end thereof and positioned inside said outer electrode; means for establishing an electric field in a treating space between said electrodes; and means for introducing an emulsion into said treating space, any of the heavier portions of said emulsion which settle in said cup-shaped electrode being discharged through said ports.

5. In a dehydrator, the combination of: a tank; a conical electrode in said tank with apex downward, there being ports in said electrode near said apex; and a deflector below said ports to prevent a short-circuit from said apex due to a conducting material passing through said ports.

6. A method of treating an emulsion, which comprises: moving a stream of emulsion into pressural contact with a downwardly diverging surface in the presence of an electric field by rotating said emulsion relative to said surface.

7. In combination: an outer electrode of conical shape, the walls thereof diverging downward; and means for introducing a stream of emulsion tangentially into the space bounded by said outer electrode whereby said stream of emulsion moves in an annular path in pressural contact with said walls.

8. In combination: central and surrounding electrodes defining a tapered treating space open at its upper and lower ends; operating means for moving one of said electrodes whereby the distance across said treating space at any section varies; means for introducing the fluid to be treated into the larger end of said treating space; and means controlled by the conductivity of said fluid in said treating space for controlling said operating means.

9. In combination: a primary electrode; a secondary electrode cooperating with said primary electrode in defining a fluid-filled tapered treating space, said primary electrode forming a ledge extending toward said secondary electrode; means for establishing a difference of potential between said electrodes whereby a high intensity electric field is set up between said ledge and said secondary electrode; and means for moving one of said electrodes relative to the other to vary the distance between said ledge and said secondary electrode as a function of the electrical conductivity of the fluid in said treating space.

10. In an electric treater for treating an emulsion, the combination of: a tank; electrode means in said tank and defining a treating space; means for setting up an electric field in said treating space whereby the heavier constituent of said emulsion settles to the bottom of said tank; a nozzle for injecting fluid to be treated tangentially into said tank at a section below said electric field; and baffle means extending downward over said nozzle to prevent said nozzle from re-emulsifying the incoming emulsion and said heavier constituent settling in said tank.

11. In an electric treater for treating an emulsion, the combination of: a tank; means for setting up an electric field in said tank to agglomerate the dispersed phase into droplets of sufficient size to settle in said tank; a downward sloping baffle extending inward from the inner wall of said tank to define a tapering space between said inner wall and said baffle whereby said droplets are guided toward the center of said tank when settling therein; and means for introducing the fluid to be treated tangentially into said tapering space.

12. A method of separating the constituents of an emulsion by the use of a non-rotatable downwardly diverging cone, which method includes the steps of: rotating a body of said emulsion in said downwardly diverging cone while said cone is held stationary whereby the heavier constituent of said emulsion tends to separate from the lighter constituent; and separately withdrawing said constituents from the interior of said downwardly diverging cone.

13. A method of separating the constituents of an emulsion by the use of a downwardly diverging cone, which method includes the steps of: establishing an electric field inside said cone; rotating a body of said emulsion in said electric field whereby the heavier constituent of said emulsion tends to separate from the lighter constituent; withdrawing said lighter constituent from the upper end of said electric field; and withdrawing said heavier constituent from the lower end of said electric field.

14. In combination in an electric treater: an outer electrode of conical shape with walls diverging downwardly; an inner electrode in said outer electrode; means for establishing an electric field between said electrodes; and means for rotating in said electric field a body of emulsion to be treated, whereby said body of emulsion moves in an annular path and in pressural contact with said walls due to the centrifugal force set up by the rotation of said emulsion.

15. In an electric dehydrator, the combination of: an outer electrode, the lower portion of which provides a vertically extending cylindrical wall; a live electrode centrally disposed with respect to said cylindrical wall; means for establishing a potential difference between said outer electrode and said live central electrode to set up an electric field, said field being substantially fluid filled; emulsion introduction means discharging emulsion immediately inside said cylindrical wall, said emulsion moving upward along the inner surface of said cylindrical wall, said outer electrode including an inward-extending inclined wall associated with said cylindrical wall and extending inward toward said central electrode at an angle with respect to the horizontal, said inward-extending wall directing said rising stream of emulsion inward in said electric field toward said live central electrode.

16. In an electric dehydrator, the combination of: an outer electrode, the lower portion of which provides a vertically extending cylindrical wall; a live electrode centrally disposed with respect to said cylindrical wall and providing a downward-extending portion; means for establishing a potential difference between said outer electrode and said live central electrode to set up an electric field, said field being substantially fluid filled; emulsion introduction means discharging emulsion immediately inside said cylindrical wall, said emulsion moving upward along the inner surface of said cylindrical wall, said outer electrode including an inward-extending inclined wall associated with said cylindrical wall and extending inward toward said central electrode at an angle with respect to the horizontal, said inward-extending wall directing said rising stream of emulsion inward in said electric field toward said live central electrode whereby said emulsion is treated in said electric field to agglomerate the dispersed phase thereof, a portion of the agglomerated liquid dropping from said downward-extending portion of said live central electrode, there being a body of said agglomerated liquid at the bottom of said cylindrical wall below said downward-extending portion and into which body of agglomerated liquid the agglomerated liquid drops from said downward-extending portion, said means for establishing a potential difference between said outer electrode and said live electrode thus establishing a potential difference between said body of said agglomerated liquid and said downward-extending portion.

MURRAY E. GARRISON.